Patented July 10, 1951

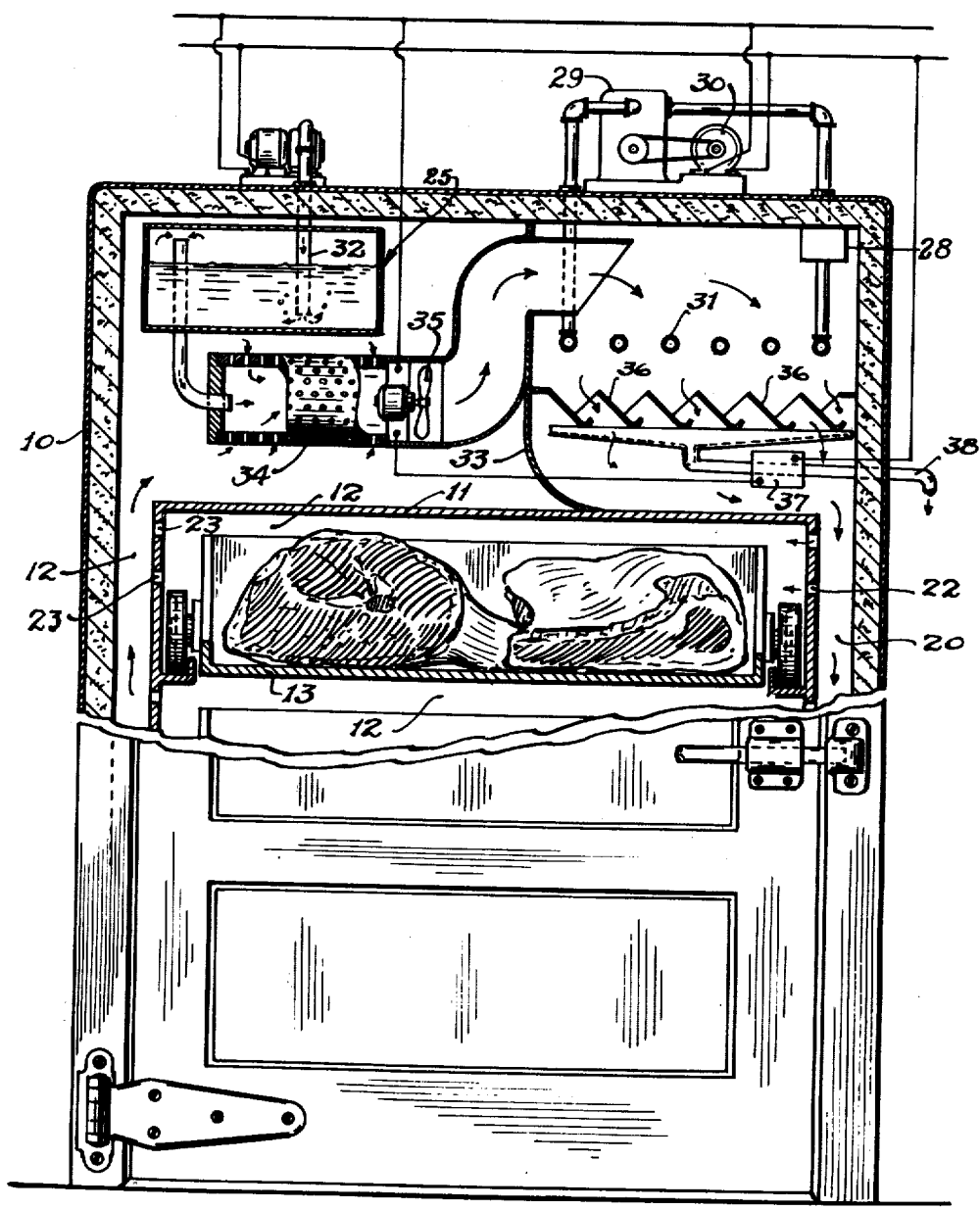

2,560,057

UNITED STATES PATENT OFFICE 2,560,057

MEAT AGING UNIT

Beverly E. Williams, Chicago, Ill., assignor, by mesne assignments, to Swift & Company, Chicago, Ill., a corporation of Illinois Application September 26, 1947, Serial No. 776,272

4 Claims. (Cl. 62—103)

This invention relates to refrigerated equipment and more particularly to an air-conditioned storage and refrigerated treating means for perishable products.

It is an object of this invention to provide an improved air-conditioning and refrigerating means for the storage of perishables.

Another object of this invention is to provide a refrigerated and air-conditioned means for preserving perishable vegetables, flowers, etc., and for aging meat.

Another object of the invention is to provide a small refrigerated and air-conditioned unit for aging meat at a retail outlet or at a point of use or consumption, such as a hotel, restaurant or hospital.

Another object of the invention is to provide an improved meat storage and aging means.

Another object of this invention is to provide definite means for inhibiting the development and propagation of mold spores on the surface of a meat product being aged.

It is another object of this invention to provide an improved apparatus having a plurality of relatively small individual zones for storing meat during performance of an aging process, such as drawers or shelves, in which zones the treating conditions can be uniformly controlled.

It is another object of this invention to provide a meat-aging apparatus having a storage compartment for holding a quantity of meat, the apparatus including an air-conditioning and refrigerating means which has sufficient capacity such that substantially uniform conditions can always be maintained in the already filled portions of the compartment, regardless of the addition of fresh meat to other portions thereof.

These and other objects will appear more fully from the specification below.

The apparatus shown in the drawings represents a partly cut away view of a preferred form of an apparatus embodying the invention.

In the past it has been the practice to age meat at meat-packing plants by hanging a side, a quarter, or a primal cut in a large refrigerated storage chamber, which is maintained at a temperature that permits the natural enzymes present in the product to become active to break down the tougher fibres in the meat cut to improve its tenderness and flavor. In these bulk operations considerable time and space are required to complete the processing, and as a result, the selling price of the finished product is quite high as compared with an untreated product.

An additional item of cost is encountered because of certain losses that are inherently produced during performance of the conventional aging process. It is apparent that in the large storage rooms now used, an exact control of all the conditions cannot be maintained, and as one consequence of this defect, the product becomes unduly dried out because the relative humidity of the atmosphere surrounding the meat cannot be held up to the ideal point or percentage. This not only detracts from the quality of the finished product, but this drying action appreciably slows down the enzymic aging process. Further, the raw edges of the meat cut are dried out to such an extent that they must be trimmed away because of their texture and appearance. Also, because of the hanging of the cuts from overhead trolleys or wall hooks, as is the usual practice, the raw edges of the flesh at the bottom of a cut being aged tend to sag, and those at the top are somewhat depressed so that the finished cut must be trimmed to eliminate this distortion. More than this, the blood and some of the flavoring components of the meat tend to seep and drain to the bottom of the cut, along with the fluids present, to such an extent that the resulting product is not uniform in quality or moisture content.

A further factor encountered in the meat aging process is the tendency of mold spores, bacteria, yeasts, and actinomyces to culture, develop, and grow on the raw cut edges of the meat. Various expedients have been proposed to control this mold growth and microbial activity, namely: the use of germicidal lamps, such as the ultraviolet ray lamp, and also the lowering of the temperature conditions in the storage room to inhibit mold and bacterial growth. It has been found, however, that while germicidal lamps do inhibit the growth of mold spores carried in the air, they simultaneously produce a darkening or blackening of the raw cut surfaces of the meat, which darker surfaces are usually trimmed away. One of the contributing factors to this darkening of the red meat is the ozone generated by these lamps, which is carried by the air circulation against the raw meat. The ozone also tends to oxidize the fat on the surface of the hanging meat, causing it to become rancid much more rapidly than would normally be the case.

And finally, it is to be noted, in following the usual commercial operations where large volumes of meat are handled for aging in a single room, that when a fresh kill of warm meat is moved into the aging room from the slaughtering floor, the atmospheric conditions of the room are radically changed. Until the animal heat is removed from the freshly slaughtered carcasses, the room will be warmer than desired, and any meat already hanging in the room is subjected to unduly high temperatures and variable humidity conditions, depending upon the ratio of warm, fresh meat to chilled meat which has already been partially aged. Such variations in temperature and humidity promote an erratic enzymic action and bacterial growth.

Some of the micro-organisms found present on the meat are attributable to the necessary handling incident to slaughter operations, including evisceration. In addition to the micro-organisms implanted on the meat in this manner, the meat may be further exposed to contact therewith when it is moved into the usual storage room, which is already substantially full of partially aged meat. It has been found that in the present-day practice the fresh meat becomes inoculated with mold spores already present on the older meat when a batch of fresh meat is moved into a partially filled or even an empty room, because by reason of their size, meat-aging rooms of the conventional art cannot be thoroughly cleaned and sterilized.

Thus it is seen that the conditions in the usual commercial aging rooms are continuously varied from the ideal, and also fresh meat must necessarily be introduced into an aging room under circumstances which contribute to cross inoculation of mold, bacteria, etc., from the older meat to the fresh. It should be stated here that while mold spores do develop and grow upon the surface of aging meat, this mold growth is not per se harmful. It is, therefore, not an object of this invention to entirely eliminate mold growth, but to control it within optimum bounds. Such growth, when not properly controlled, does detract from the appearance of the finished product, and for this reason the unsightly product must be trimmed away, whereby a loss is produced. Such mold growths, even though comparatively uncontrolled on conventionally aged meat product, are not ordinarily toxic to humans, although they may be consumed with the cooked aged meat product.

It is thus seen, due to the limitations inherent in the present-day aging process, that the cost of aged meat is somewhat higher than fresh meat, and ordinarily this product can be furnished only to the luxury trade, including hotels and restaurants, clubs, and the like. The losses produced in aging, such as shrink, trimming losses, and the slight change in quality due to drying out, are, of course, balanced by improvements in flavor, and particularly in tenderness. It is the purpose of the present invention to produce corresponding or greater improvements in flavor and tenderness, together with an increase in the ultimate quality of an aged meat product. This is to be accomplished in a much shorter length of time and without the usual resultant loss from shrinking, trimming and drying out.

The present invention proceeds upon the theory of providing an apparatus adapted to produce ideal conditions for aging a meat product by dividing the product being treated into small lots so that the desired conditions for proper aging can be quickly produced and maintained uniformly during the entire aging period. At the same time, provision is made for isolating the individual lots of the product in a confined and controlled zone, free from possible contamination from all sources. The apparatus here provided may be used at a central plant, especially when it is desirable to subsequently quick-freeze the aged product, but in its preferred form, the unit is designed to be located at retail outlets, where the consumer can actually see the product being treated.

When meat is aged at the retail outlet, the somewhat more perishable aged meat can be distributed immediately to the consuming trade while this meat is in prime condition after it has reached the desired age. When aged at the retail outlet, or hotel, restaurant, hospital, or the like, the meat can be quickly consumed after completion of aging and before it has a chance to lose any of its improved quality. As above stated, the aged meat is more subject to change and deterioration than fresh meat, and thus, as soon as the product has been aged properly, it can be immediately placed in the consumer's hands.

If so desired, the meat, after having been aged as here taught, may be cut into consumer-size steaks, roasts, and chops, and promptly quick-frozen to seal in all the goodness and flavor of the properly aged meat, and may be held at 0° F. freezer storage temperature until time to be cooked.

By dividing the batch of the meat product to be aged into small lots, ideal conditions can be maintained for each portion until the entire aging process has been completed. In this manner substantially all shrinkage can be avoided, since the atmosphere can be maintained at nearly 100 per cent relative humidity. Because of the elimination of unnecessary drying, the raw edges, or cut meat surfaces, are not deteriorated so as to require trimming, and the enzymic action which requires the presence of moisture can proceed under the most favorable conditions.

A further advantage to be gained by aging meat in small lots in a confined zone, as here taught, resides in the fact that the conditioned air flowing over the meat can be sterilized and so treated prior to passage over the surface of the individual cuts, whereby substantially all mold spores can be eliminated therefrom, with the result that trimming of the cut due to the growth of mold on the raw meat surfaces can be minimized. When this is done, the conditioning of meat product in small batches can proceed under temperature conditions within the confined zone generally higher than those formerly used in aging rooms, and can be held more closely within the ideal range for promoting the enzymic action.

The meat processed in accordance with this teaching is aged in an air stream wherein ideal atmospheric conditions are maintained, and an optimum quantity of air is caused to flow around the meat consistent with proper ventilation but without subjecting the meat to conditions which produce the above-mentioned defects, such as result from performance of the conventional meat-aging methods.

The preferred form of this invention, as shown in the drawings, is embodied in a unitary cabinet structure of a size that may be adapted to any retail outlet, or home, or farm, or, of course, it may be built in a somewhat larger unit size for operation in a wholesale plant. The unit provides a chamber divided into compartments for receiving the meat to be aged, and suitable air-conditioning and refrigerating means are built into the unit to carry the entire load of humidifying and chilling the air circulated over all portions of the batch of the meat product disposed in that particular unit. The humidifying means is adequate in size to moisten the fresh air taken into the unit and to maintain the moisture of the recirculated air at substantially 100 per cent relative humidity, and the refrigerating means is designed to constantly cool the entire quantity of air, being circulated over the product, to the desired temperature. The conditioned air is delivered through the cabinet, and inlet means are provided to direct the treated air into each of the individual compartments of the storage chamber. These inlets are operative to carry a separate supply of air into each compartment, and each of the air streams flows through the compartment into which it is delivered, over the meat contained therein, and outwardly to a return duct leading to the air-cleaning, humidifying, refrigerating, and circulating means.

The cabinet may be divided into compartments by suitable means, as drawers, trays, or shelves which may be made removable, and after the meat disposed thereon has been properly aged, the meat holding means may be withdrawn and sterlized before it is again put in use. The refrigerating, humidifying, and air-circulating equipment is designed in accordance with the size of the various drawers, etc., built into the cabinet in order that it may have ample refrigerating capacity to thoroughly cool each air stream flowing to any portion of a batch of meat freshly loaded on either of the various meat-holding means. With this structure the heat from any one freshly-loaded sectional drawer cannot be transmitted to another drawer; thus, each individual portion of any batch of meat can be quickly brought to and stored at the ideal temperature for efficient aging without affecting or being influenced by meat stored in any of the other meat-holding means.

It has been found that meat, particularly beef, lamb, veal, and mutton, can best be aged at a temperature of around 39½° F. in an atmosphere having a relative humidity within the range of upwards of 92½ per cent to 100 per cent. In the cabinet here shown means are provided for changing the air completely from one to four times every 24 hours, and the conditioned air is circulated over the surface of the meat product being aged at a velocity of between 40 to 60 feet per minute, but usually at about 50 feet per minute.

Referring to the drawing, the present invention is shown as being built into the cabinet structure 10, which is provided with an inner shell 11, defining a chamber that is divided into a plurality of compartments 12 to receive the meat to be aged. The chamber is preferably divided into the individual compartments 12 by means for holding the meat to be aged, which means preferably takes the form of trays, or shelves, or drawers 13 that are mounted on suitable roller means 14, carried on tracks fixed to the side walls of shell 11. The drawers 13 are removably mounted on the rollers 14 and may be easily withdrawn from the cabinet for the purpose of being washed and sterilized whenever need be.

The space at the sides of the unit between the cabinet and shell walls is designed to serve as air ducts 20 and 21, which connect to the air-conditioning means located at the top of the cabinet. Conditioned air is driven downwardly through the duct 20 and is issued into each of the compartments 12 through a series of inlet ports 22 leading from duct 20. The conditioned air is caused to flow horizontally across each of the compartments in the chamber 12 and issues through outlet ports 23 into the return duct 21, from whence the air passes to the conditioning means.

The air-conditioning means is most conveniently mounted at the top of the cabinet to facilitate the air circulation and for accessibility, and this means includes a suitable heat-exchanging or refrigerating mechanism 30 which circulates a refrigerant through coils 31, located inside of the cabinet. Pump case 29 of refrigerating mechanism 30 also houses a suitable condenser which may be air or water cooled in a manner well known in the art. An expansion valve 28 between coils 31 and the pump in case 29 is also employed. Suitable thermostatic control mechanism (not shown) may be used to regulate the expansion valve in accordance with the temperature of the air circulating through the box in the well known manner. A fresh air intake 32 is also provided at the top of the cabinet, and the fresh make-up air is drawn into the air passages through a suitable purifying means, generally 25, forming an air passage into the cabinet. Preferably the purifier takes the form of means to forcibly bubble the fresh air through a water bath or scrubbing tower which simultaneously washes the air and produces a suitable humidity therein. Fresh air in an amount about equal to one of four complete air changes per 24 hours is normally taken in during the aging process, and the old air passes out through leaks provided for this purpose. Satisfactory results are secured if one-fourth cubic foot per minute of air is introduced through the intake 32 in a cabinet of approximately 115 cubic feet, which amount of air will supply approximately three changes per 24 hours. If desired, the fresh air can be passed through additional purifying means such as the filter described below.

A free space is provided above the upper end of shell 11 and the upper end of the cabinet 10 through which air may flow from the return duct 21 to the supply duct 20. The air flow in the space is controlled by a baffle 33 so that it must flow through a filter 34 mounted in front of baffle 33 while passing from the return duct to the supply. The filtering means 34 preferably takes the form of a perforated canister of activated carbon which is adapted to purify and adsorb odors and certain other volatile gases entrained in the air flowing to the filter. The fresh air coming in from the water bath intake or other suitable filtering or cleaning means is also pumped past the baffle 33, and the mixture of fresh and the clean recirculated and deodorized air issuing past baffle 33 is delivered to the cooling coils from whence the pure, humidified, and cool air passes downwardly to enter into the inlet duct 20.

The air movement past baffle 33 is produced by a fan 35 positioned at any suitable point, and this circulation is further encouraged by the gravity action produced by the tendency of cold air to settle and warm air to rise, i. e., because of the thermosiphonic set-up of the system. The cool air falling from the coils moves into the top of the inlet passage 20, and the warmer air rises in the outlet passage or stack 21 on the other side of the chamber.

The air-cooling coils are operated at a temperature above the freezing point of water but at a sufficiently low temperature to uniformly maintain the air stream flowing to the meat at a temperature of approximately 39½° F. By operating the cooling coils 31 at such a temperature, involving only a small temperature differential, the amount of moisture which is precipitated out of the air and deposited on the cooling coils is minimized so that the air is not unduly dried. Any moisture which does condense on the coils drips onto a baffle structure 36 provided underneath the cooling coils and flows downwardly over the surface of the baffles to a vaporizing means such as a suitable heating means 37, which may include an electrically-heated element or one utilizing the heat of the refrigerant gas as it comes from the compressor. This vaporizing means 37 serves to evaporate most or all of the condensed moisture directly into the air stream so that the relative humidity of the air flowing into duct 20 is maintained at or near 100 per cent. Any excess condensate may flow to the sewer through drain pipe 38. The baffles 36 are constructed so that they may be quickly removed and sterilized during a cleanup operation, and they are so mounted, as shown in the drawings, as to promote the streamline motion of the air.

The structure described above is operative to circulate properly conditioned air over small lots or portions of a batch of a meat product to permit the individual portions of the product to age under ideal conditions. A minimum quantity of properly conditioned air is circulated over the surface of the product to hold the temperature of the meat constant and uniform while the aging process takes place. The temperature and humidity characteristics of the air are carefully controlled so that uniform conditions prevail at all times throughout each of the storage chambers 12, and, in addition, the air is so circulated through compartments 12 that substantially all possibilites of cross-contamination as between the different portions of any batch of the meat product being aged are eliminated. Furthermore, due to the conditioning and purification of the air, mold growth is minimized and the aging process can be performed at a faster rate so that meat can be aged in a period of from 3 to 6 days, as compared with a normal aging period of from 3 to 6 weeks of the prior art. This speed-up is due to the improved construction here shown, which is adapted to the aging of relatively small lots of meat in a confined and air-conditioned zone under ideal conditions wherein the temperature, humidity, air movement, and make-up air are adjusted to encourage the enzymic action. In addition to these advantages, the meat is aged without being unduly dried out so that shrinking and trim losses from this source are minimized.

It will be noted that the drawers 13 are of such size that the usual cuts of a carcass can be disposed horizontally on the drawers while being stored in the compartments during treatment. Such an arrangement eliminates all sagging or other displacement of the raw edges of the product, and the natural juices and flavoring components are retained in the product more fully since they cannot drip away to any extent. The uniformity of the shape of the product and its composition are better preserved in this manner.

The invention has been described above in connection with the aging of meat, wherein ideal storage conditions are maintained for a considerable period of time in order to preserve the meat while aging it. It is obvious that this apparatus could be used for storing other perishable food products which would otherwise deteriorate upon the loss of moisture or with changes produced by heat. This refrigerated means provides an excellent storage arrangement for fresh fruit and fresh vegetables and particularly those which have a high moisture content, such as lettuce, tomatoes, cabbage, etc., and also for cut flowers, which quickly wilt unless kept refrigerated and humidified.

It has been especially noted that leafy vegetables and flowers are preserved more nearly in their original condition by storage in a chilled atmosphere having a relative humidity of near 100 per cent as compared with the conventional practice of spraying water on vegetables at room temperature and at ordinary atmospheric conditions. The moisture or water vapor of the substantially saturated air seems to wet them in a fundamentally different manner than is accomplished by merely placing drops of moisture at spaced points of the surface thereof as when spraying vegetables in the market bins with a water mist. In using this storage device for this purpose the product is wetted and absorbs the moisture in a basically different manner, which seems to preserve substantially all of the natural characteristics of the product.

While the above is a description of the preferred form of this invention, it is obvious that many modifications thereof will occur to those skilled in the art which will fall within the scope of the following claims.

I claim:

1. An air-conditioned and refrigerated means for perishable products comprising a cabinet adapted to enclose a given space, means for dividing the space within the cabinet into individual compartments; means within said cabinet to filter, to humidify to approximate saturation, and to refrigerate air; means to conduct the refrigerated air down one side of the cabinet, and return it up the other side of the cabinet; means to create a circulation of said air through said conducting means to produce an air stream across each of said compartments at a velocity of 40 to 60 feet per minute and return the air to said filtering, humidifying, and refrigerating means; and means to provide access to each of said individual compartments.

2. An air conditioned and refrigerated device for perishable products including a cabinet enclosing a given space, means for dividing said space into an individual compartment and to support said products therewithin, said means including an air duct within the cabinet through which duct air may be circulated, said compartment having an inlet and an outlet port so positioned with respect to each other that the air flow between said ports will pass over the majority of the product within the compartment, said duct communicating with said inlet and outlet ports, a fresh air inlet for said cabinet, an intake passage communicating with said fresh air inlet and with said duct, means to deliver fresh air from said inlet through said passage and into said duct at a point where said fresh air is mixed with recirculated air in the duct, air washing and humidifying means in said passage to wash and humidify the fresh air delivered through said passage, an air pump in said cabinet to circulate air through said duct in a direction such that the air passes through said compartments from said inlet port to said outlet port, filter means in said duct between said outlet port and said point to filter the recirculated air before it is mixed with the fresh air, and heat exchanging means within said duct between said point and said inlet port, said heat exchanging means being adapted to receive a refrigerant and to cool the air circulating through the duct and about said heat exchanging means to thereby reduce the temperature of the circulating air and raise the relative humidity thereof immediately before the air enters the inlet port to circulate over the product.

3. An air conditioned and refrigerated device for perishable products including a cabinet enclosing a given space, means for dividing said space into an individual compartment and to support said products therewithin, said means including an air duct within the cabinet through which duct air may be circulated, said compartment having an inlet and an outlet port so positioned with respect to each other that the air flow between said ports will pass over the majority of the product within the compartment, said duct communicating with said inlet and outlet ports, a fresh air inlet for said cabinet, an intake passage communicating with said fresh air inlet and with said duct, means to deliver fresh air from said inlet through said passage and into said duct at a point where said fresh air is mixed with recirculated air in the duct, air washing and humidifying means in said passage to wash and humidify the fresh air delivered through said passage, an air pump in said cabinet to circulate air through said duct in a direction such that the air passes through said compartments from said inlet port to said outlet port, heat exchanging means within said duct between said point and said inlet port, said heat exchanging means being adapted to receive a refrigerant and to cool the air circulating through the duct and about said heat exchanging means to thereby reduce the temperature of the circulating air and raise the relative humidity thereof immediately before the air enters the inlet port to circulate over the product, baffle means in said duct below said heat exchanging means to receive any drops of moisture condensed by said heat exchanging means, and a drain for said baffle means.

4. An air conditioned and refrigerated device for perishable products including a cabinet enclosing a given space, means for dividing said space into an individual compartment and to support said products therewithin, said means including an air duct within the cabinet through which duct air may be circulated, said compartment having an inlet and an outlet port so positioned with respect to each other that the air flow between said ports will pass over the majority of the product within the compartment, said duct communicating with said inlet and outlet ports, a fresh air inlet for said cabinet, an intake passage communicating with said fresh air inlet and with said duct, means to deliver fresh air from said fresh air inlet through said passage and into said duct at a point where said fresh air is mixed with recirculated air in the duct, air washing and humidifying means in said passage to wash and humidify the fresh air delivered through said passage, an air pump in said cabinet to circulate air through said duct in a direction such that the air passes through said compartments from said inlet port to said outlet port, heat exchanging means within said duct between said point and said inlet port, said heat exchanging means being adapted to receive a refrigerant and to cool the air circulating through the duct and about said heat exchanging means to thereby reduce the temperature of the circulating air and raise the relative humidity thereof immediately before the air enters the inlet port to circulate over the product, baffle means in said duct below said heat exchanging means to receive any drops of moisture condensed by said heat exchanging means, said baffle means including a plurality of baffles positioned at an angle with respect to the vertical so as to intercept any falling drops of moisture without materially interfering with the flow of air through the duct, and a drain for said baffle means.

BEVERLY E. WILLIAMS.

REFERENCES CITED

The following references are of record in the file of this patent:

UNITED STATES PATENTS

| Number | Name | Date |
|---|---|---|
| 2,166,283 | Betz | July 18, 1939 |
| 2,192,348 | James | Mar. 5, 1940 |
| 2,217,204 | Jalma | Oct. 8, 1940 |
| 2,314,301 | Williams | Mar. 16, 1943 |
| 2,382,084 | Mathews | Aug. 14, 1945 |